Jan. 3, 1939.   B. LOEFFLER   2,142,950
PNEUMATIC DIESEL AIR CHAMBER VALVE CONTROL MECHANISM
Filed Nov. 5, 1935   4 Sheets-Sheet 1

INVENTOR.
Bruno Loeffler;
BY Hoguet, Neary + Campbell,
HIS ATTORNEYS

Jan. 3, 1939.    B. LOEFFLER    2,142,950
PNEUMATIC DIESEL AIR CHAMBER VALVE CONTROL MECHANISM
Filed Nov. 5, 1935    4 Sheets-Sheet 2
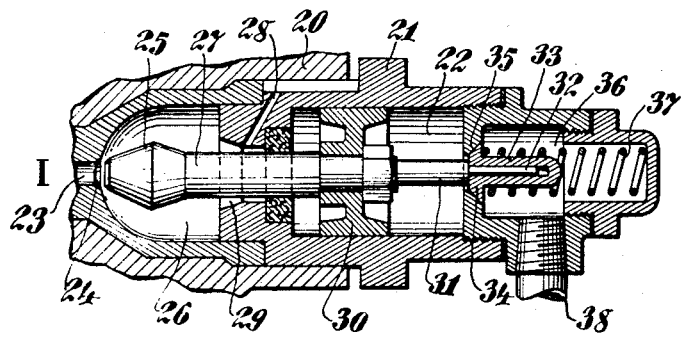
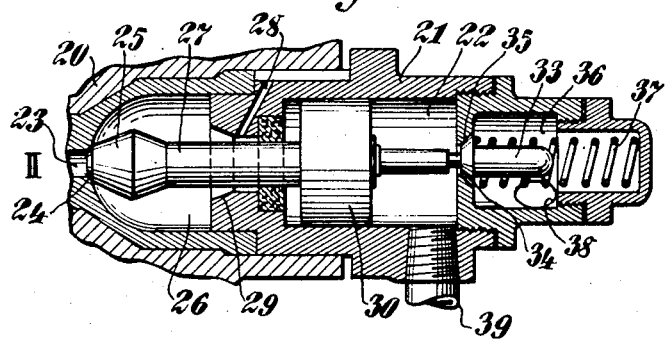
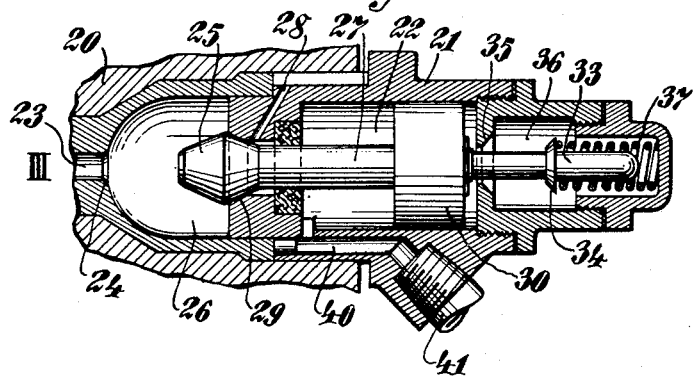
INVENTOR.
Bruno Loeffler,
BY
HIS ATTORNEYS

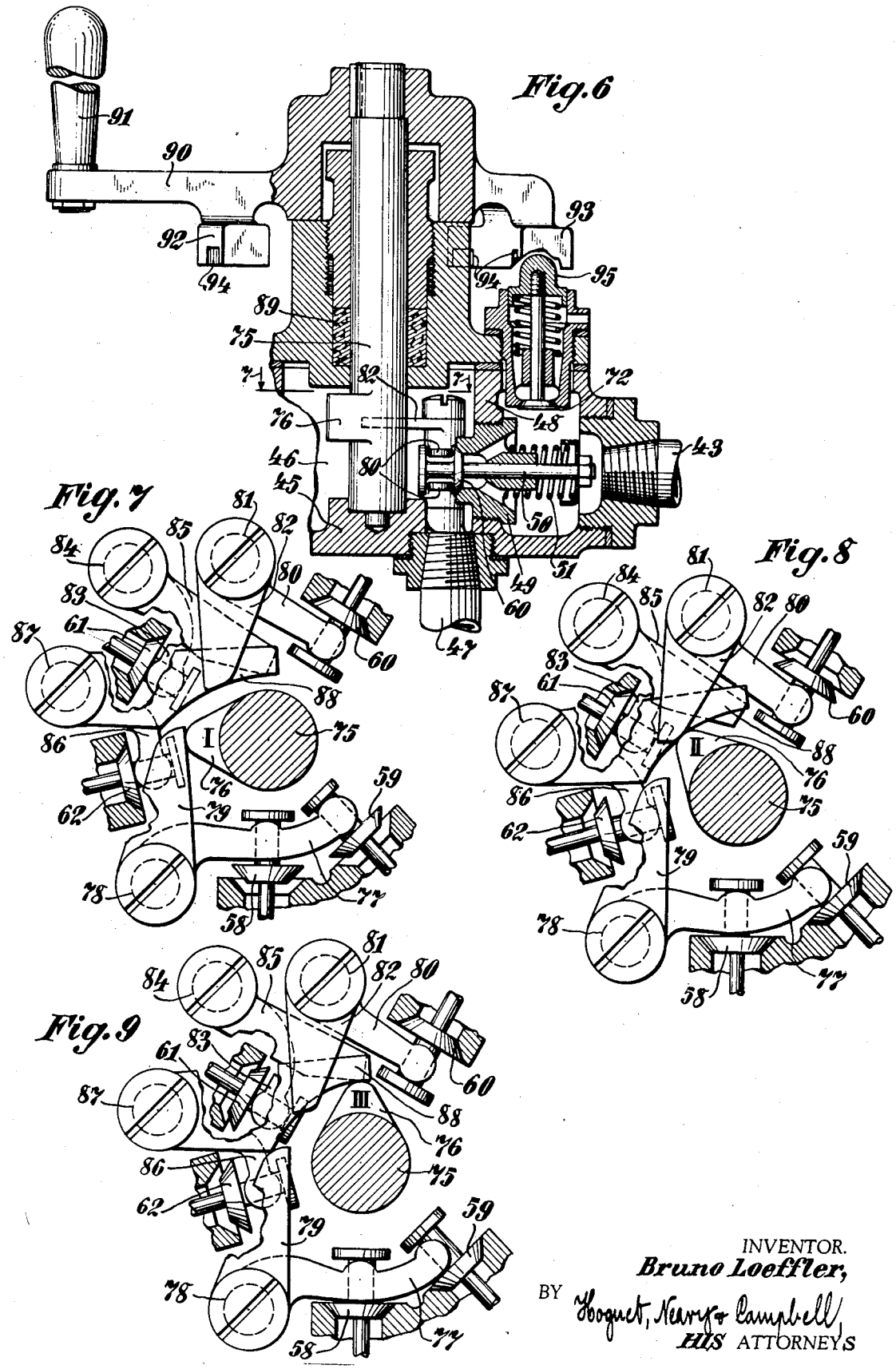

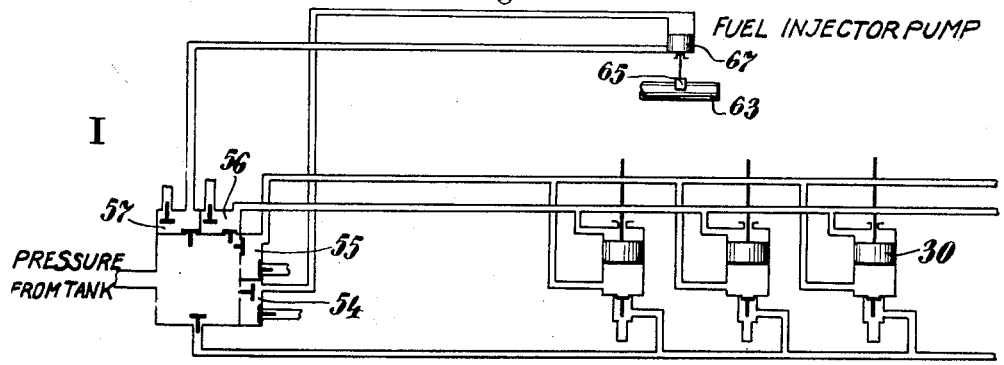
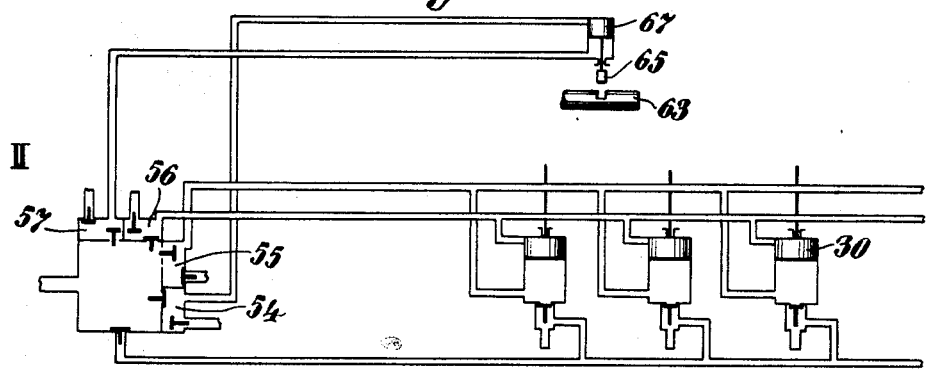
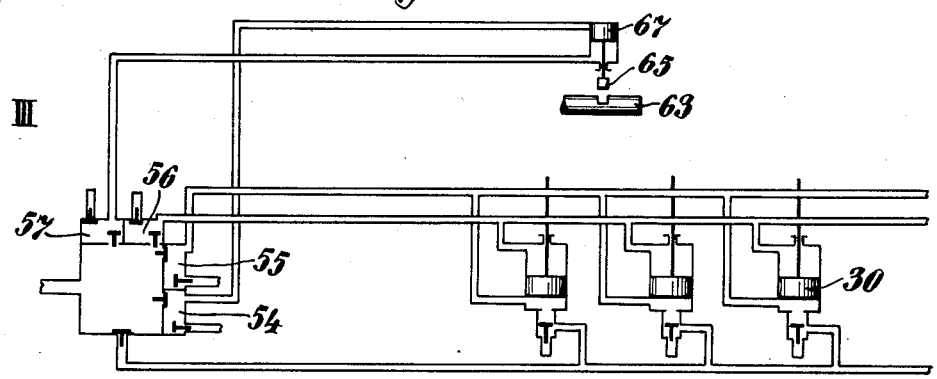

Patented Jan. 3, 1939

2,142,950

UNITED STATES PATENT OFFICE 2,142,950

PNEUMATIC DIESEL AIR CHAMBER VALVE CONTROL MECHANISM

Bruno Loeffler, Plainfield, N. J., assignor to Mack Manufacturing Corporation, a corporation of Delaware Application November 5, 1935, Serial No. 48,276

5 Claims. (Cl. 137—144)

The present invention relates to mechanisms by means of which the air valves of Diesel engines may be controlled from a remote station and embodies, more specifically, an improved mechanism for effecting such operation and control pneumatically.

The invention is particularly adapted for the operation and control of valves for Diesel engines which are provided with combustion and air chambers, the combustion chamber communicating with the cylinder and also with the air chamber and external atmosphere through the air chamber. In order that the engine may be controlled effectively during the cranking, idling and running conditions, an air valve is provided in the air chamber which is movable axially to shut off communication between the combustion chamber and air chamber during starting and idling positions in order to increase the compression within the combustion chamber. During the cranking operation, the valve is in an open position in order that decompression may be effected by providing communication between the combustion chamber and the external atmosphere through the air chamber. During normal running operation, the valve is seated in such fashion as to prevent communication between the air chamber and the external atmosphere, while establishing communication between the air chamber and the combustion chamber.

In order that the operation of this valve may be effected conveniently from a remote station, the present invention contemplates providing elements by means of which pneumatic action may be used to effect operation of the valve. More particularly, the invention provides a source of air pressure with selective valve to subject the air valve to such source of pressure in order that the valve may be moved in a desired manner.

An object of the invention, accordingly, is to provide a pneumatically operated mechanism by means of which the operation of Diesel air valves may be controlled.

A further object of the invention is to provide a device of the above character having manually operated mechanism located at a remote station, such mechanism being selectively operated to effect desired operations of the air valve.

Further objects of the invention will be readily apparent as it is described in further detail in connection with the accompanying drawings, wherein Figure 1 is a view in side elevation, showing a portion of a Diesel engine with an air valve operating mechanism mounted thereon, the figure also showing a pneumatic control system constructed in accordance with the present invention;

Figure 3 is a view in longitudinal section, taken through an air valve and operating means therefor constructed in accordance with the present invention, this view being taken on line 3—3 of Figure 1 and looking in the direction of the arrows. In this figure, the valve is shown in its open position, corresponding to the first or cranking position of the mechanism;

Figure 4 is a view similar to Figure 3, showing the valve seated in its second position, corresponding to the starting and idling position of the mechanism;

Figure 5 is a view similar to Figure 3, showing the valve in its third or normal running position;

Figure 6 is a view in section taken on the broken line 6—6 of Figure 2, and looking in the direction of the arrows;

Figure 7 is a view in section taken on line 7—7 of Figure 6 and looking in the direction of the arrows, this view illustrating the elements in the first or cranking position of the mechanism;

Figure 8 is a view similar to Figure 7, showing the control mechanism in the second position, corresponding to the starting and idling position of the mechanism;

Figure 9 is a view in section similar to Figure 7, showing the elements in the third or normal running position;

Figure 10 is a diagrammatic illustration of the fluid system in the first or cranking position thereof;

Figure 11 is a similar diagrammatic view of the elements in the second or starting and idling position thereof; and Figure 12 is a view similar to Figure 10, showing the elements in the normal running position of the mechanism.

Figure 1:
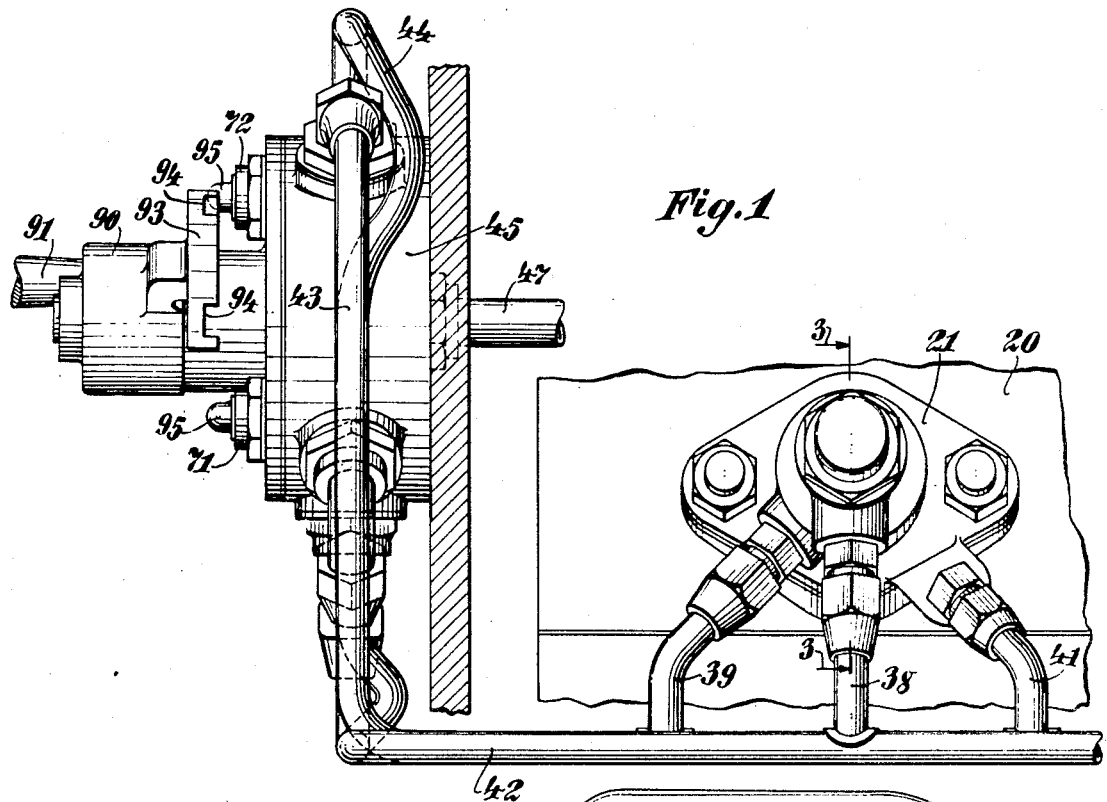

Referring to the above drawings, a Diesel engine is partially shown at 20 and is provided with a plate 21 within which a cylinder 22 is formed. The engine is provided with a combustion chamber (not shown) which communicates with a passage 23 and a valve port 24. A valve 25 is received within an air chamber 26 and is mounted upon a valve stem 27 which is slidably mounted at one end of the cylinder 22. A passage 28 serves as a means for providing communication between the air chamber 26 and the external atmosphere, a valve seat 29 being provided against which the valve 25 may be seated to prevent communication between the air chamber 26 and the passage 28.

Axial motion of the valve 25 is effected by means of a piston 30 which is slidably received within the cylinder 22, the valve stem 27 having a reduced portion 31 upon which a guide rod 32 is formed. A sleeve 33 is slidably mounted on the rod 32 and is provided with a valve 34 which is normally urged against a valve seat 35, formed between the outer end of the cylinder 22 and a pressure chamber 36. A spring 37 may be provided for this purpose.

A conduit 38 communicates with the pressure chamber 36 while a conduit 39 is provided to communicate with the outer end of the cylinder 22. The inner end of the cylinder 22 communicates with a passage 40 which in turn communicates with a conduit 41 in order that the pressure within the cylinder and upon opposite sides of the piston 30 may be suitably controlled. Figures 3, 4 and 5 illustrate the foregoing valve mechanism and the operating elements therefor.

Conduit 38 connects with a pipe line 42 while conduit 39 connects with a pipe line 43 and conduit 41 with a pipe line 44.

The conduits 42, 43 and 44 are connected with a control casing 45 which may be located at a remote station and is provided with suitable fittings in order to facilitate connection of the conduits 42, 43 and 44 thereto. The interior of the control housing 45 is formed with a central pressure chamber 46 which is connected with a suitable source of air pressure through a pipe line 47. The peripheral wall of the pressure chamber is shown at 48 in Figures 2 and 6 in which wall are provided a plurality of fittings 49 to be described presently. Each of the fittings carries a valve stem 50 upon which valves are mounted, springs 51 being provided to urge the valves into a normally closed position.

Radial partitions 52 are provided to form a plurality of valve chambers 53, 54, 55, 56 and 57, respectively. A valve 58 is mounted on the valve stem 50 and controls the communication between valve chamber 53 and pressure chamber 46, while a valve 59 controls such communication between the pressure chamber 46 and the valve chamber 54. Valve chamber 55 is subjected to the pressure within pressure chamber 46 by means of a valve 60, while the valve chamber 56 is subjected to such pressure by means of a valve 61 and valve chamber 57 by means of a valve 62. As will be readily apparent, conduit 42 communicates with the valve chamber 53, while conduit 43 communicates with valve chamber 55 and conduit 44 with valve chamber 56.

In order that the operation of the fuel injector may be controlled so that it is locked when the mechanism is in the cranking position, the fuel injector control rod 63 is formed with a flange 64 with which a detent 65 is adapted to cooperate to prevent operation thereof. Detent 65 may be formed with a guide rod 66 upon which a piston 67 is formed. The piston 67 is slidably received within a cylinder 68, at the opposite ends of which communication with the pressure walls may be established by means of pipe lines 69 and 70. Pipe line 69 communicates with valve chamber 57 while pipe line 70 communicates with valve chamber 54.

Each of the valve chambers 54 and 55 and 56 and 57 is provided with a relief valve 71, 72, 73 and 74, respectively. These relief valves, when opened, establish communication between the respective valve chambers and the external atmosphere. The valves 58, 59, 60, 61 and 62 are operated by means of a manually rotatable shaft 75 having a cam 76 formed thereon. Valves 58 and 59 are mounted upon a common arm 77 which is journaled at 78 and provided with a cam follower 79 in order that the cam 76 may be moved to engage the follower 79 and lift the valves from their respective valve seats.

Valve 60 is actuated by an arm 80 which is journaled at 81 and is actuated by a cam follower 82 which is also adapted to be engaged by the cam 76. In like manner, valve 61 is mounted upon an arm 83 which is journaled at 84 and is actuated by a cam follower 85. Valve 62 is adapted to be actuated by an arm 86 which is journaled at 87 and is provided with a cam follower 88.

Shaft 75 is journaled in the casing 45 and a suitable backing 89 is provided to seal the casing effectively. The outer end of shaft 75 carries an arm 90 having a manually operated handle 91 secured to the outer end thereof. The arm 90 is formed with sectors 92 and 93 which are formed with spaced notches 94 adjacent the ends thereof. These notches are adapted to receive detents 95 which are carried by the ends of the respective valves 71, 72, 73 and 74, the sectors 92 and 93 serving to depress the said detents to open the respective valves when the arm 90 is moved into proper position.

With a source of pressure provided through pipe line 47, the mechanism operates in the following manner. When the arm 90 is moved into such position that the cam 76 is in the position shown in Figure 7, valves 58 and 59 are open, thus supplying pressure to pipe lines 42 and 70. The air pressure within pipe line 70 forces piston 67 into the position shown in Figure 2, locking the fuel injector control rod 63. Inasmuch as pipe line 69 communicates with the atmosphere through valve 74 which has been opened by the sector 92 (Figure 2) such motion of the piston 67 is permitted. Pressure within the pipe line 42 is supplied to the pressure chamber 36, thus moving piston 30 to the left until valve 34 is seated on its seat 35. Spring 37 causes valve 34 to follow the movement of piston 30 until the valve 34 is closed. The air valve 25 is thus moved to the position shown in Figure 3.

Figure 2:
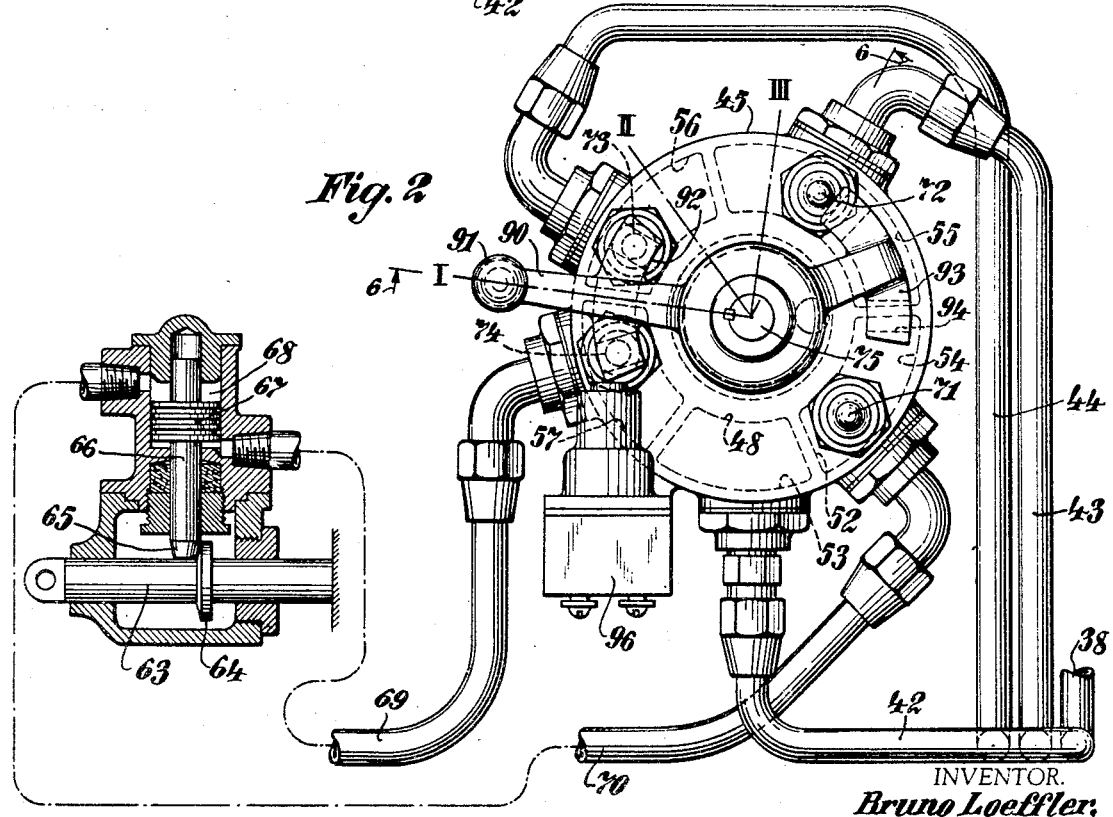
Figure 2 is a view in end elevation, showing the control mechanism of Figure 1.

Motion of the arm 90 into the second position, indicated by the Roman numeral II in Figure 2, maintains the relief valve 73 open so that the valve chamber 56 communicates with the atmosphere, thus maintaining the pipe line 44 as a low pressure line. Such motion of the lever 90 causes the cam 76 to move into the position shown in Figure 8 at which time follower 82 is actuated to open the valve 60 and permit the pressure within the pressure chamber 46 to be applied through pipe line 43 to the connection 39, moving the piston 30 into the position shown in Figure 4. At the same time, valve 62 is opened by the cam follower 88 and pressure is supplied to the pipe line 69. Pipe line 70 is connected to the atmosphere by the opening of relief valve 71 by means of sector 92. In this fashion the detent 65 is elevated and actuation of the fuel injector control rod 63 is permitted. Pipe line 44 communicates with the atmosphere inasmuch as valve chamber 56 is open thereto by the relief valve 73 which the sector 92 maintains in an open position. This operation is illustrated by Figure 11 and represents the position of the parts when the engine is in the starting and idling operating stage.

When the engine is running normally, the arm 90 is moved until the cam 76 is in the position shown in Figure 9, at which time the cam followers 85 and 88 are actuated to open valves 61 and 62. This position of valve 62 has been described in connection with the position of the parts when the engine is in the starting and idling operating stage. The opening of valve 61 applies the pressure from pressure chamber 46 through the pipe line 44 to the connection 41 and passage 40, thus providing pressure between the piston 30 and the inner end of the cylinder 22. The outer end of the cylinder 22 communicates with the atmosphere through connection 39, pipe line 43, and relief valve 72 which the sector 92 has now opened. This results in the moving of the piston 30 to the extreme right hand position as illustrated in Figure 5, and valve 25 is seated against the seat 29. Figure 12 illustrates the foregoing operation.

In order that the starting motor may be operated when the parts are in the position corresponding to Roman numeral I, which is the cranking position, a switch 96 is provided which is actuated by the sector 92 to permit the electrical connection with the starting motor to be completed. When the arm 90 is moved into the second and third positions, corresponding to the starting and running conditions of the engine, the switch is opened, thus preventing inadvertent operation of the starting motor.

It will thus be seen that a pneumatic system has been provided by means of which operation and control of the air valves of a Diesel engine may be effected from a remote station.

While the invention has been described with reference to the specific construction shown in the accompanying drawings, it is not to be limited, save as defined in the appended claims.

I claim:

1. Pneumatic operating mechanism for Diesel engine air valves having cranking, starting and running positions comprising an air valve, a piston connected to the air valve, a cylinder in which the piston operates, means to introduce air under pressure into the cylinder at opposite ends thereof to move the piston into two positions, a pressure chamber communicating with the cylinder through a valve port, a valve for the last named valve port and connected to the piston, a spring to urge the last named valve into a closed position, and means to introduce a pressure into the pressure chamber.

2. Pneumatic operating mechanism for Diesel engine air valves having cranking, starting and running positions comprising an air valve, a piston connected to the air valve, a cylinder in which the piston operates, means to introduce air under pressure into the cylinder at opposite ends thereof to move the piston into two positions, a pressure chamber communicating with the cylinder through a valve port, a valve for the last named valve port and connected to the piston through a lost motion connection, a spring to urge the last named valve into a closed position, and means to introduce a pressure into the pressure chamber.

3. Pneumatic operating mechanism for Diesel engine air valves having cranking, starting and running positions comprising an air valve, a piston connected to the air valve, a cylinder in which the piston operates, means to introduce air under pressure into the cylinder at opposite ends thereof to move the piston into two positions, a pressure chamber communicating with the cylinder through a valve port, a valve for the last named port, a guide rod on the piston extending into the pressure chamber, means to mount the last named valve on the guide rod with provision for a degree of lost motion therebetween, a spring to urge the last named valve into a closed position, and means to introduce air under pressure into the pressure chamber.

4. Pneumatic operating mechanism for Diesel engine air valves having cranking, starting and running positions comprising an air valve, a piston connected to the air valve, a cylinder in which the piston operates, means to introduce air under pressure into the cylinder at opposite ends thereof to move the piston into two positions, a pressure chamber communicating with the cylinder through a valve port, a valve for the last named port, a guide rod on the piston extending into the pressure chamber, means to mount the last named valve on the guide rod with provision for a degree of lost motion therebetween, a spring to urge the last named valve into a closed position, and means to introduce air under pressure into the pressure chamber and into the end of the cylinder adjacent the pressure chamber.

5. Pneumatic operating mechanism for Diesel engine air valves having cranking, starting and running positions comprising an air valve, a piston connected to the air valve, a cylinder in which the piston operates, means to introduce fluid under pressure into the cylinder at opposite ends thereof to move the piston into two positions, additional means to introduce fluid under pressure into one end of the cylinder, and a spring controlled valve to limit the action of one of the two said fluid introducing means upon the same side of the piston.

BRUNO LOEFFLER.